April 26, 1927.
E. N. TUCKEY
AIR MOTOR
Filed June 28, 1923
1,626,313
3 Sheets-Sheet 2
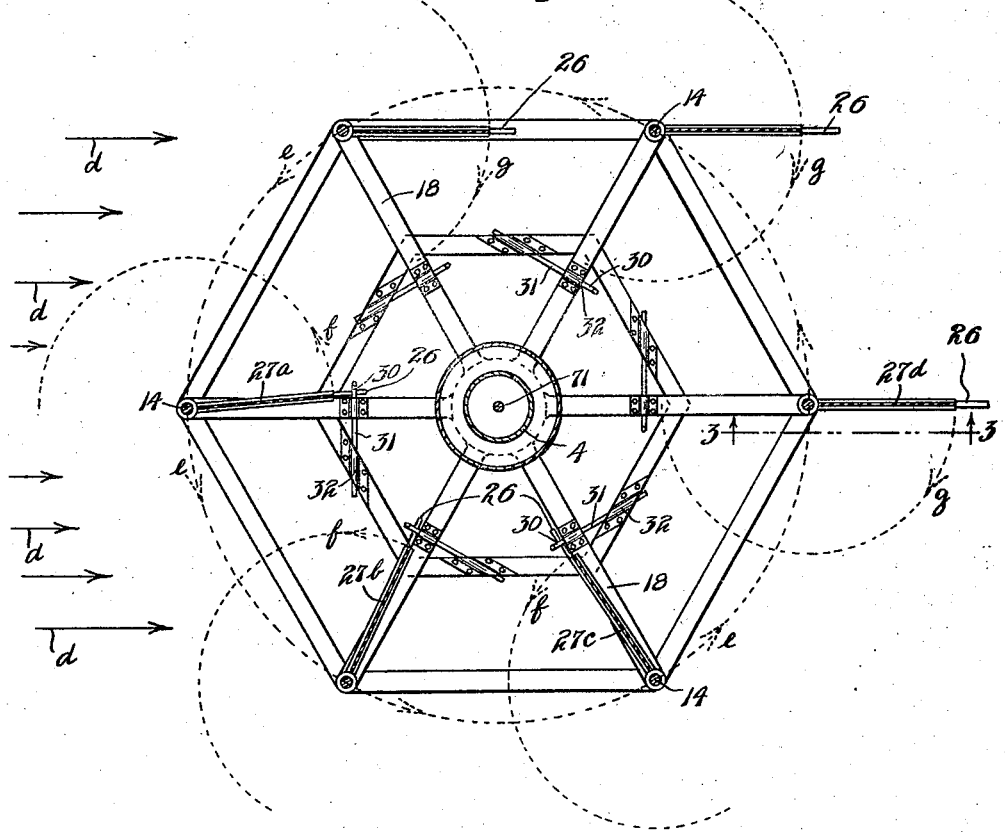
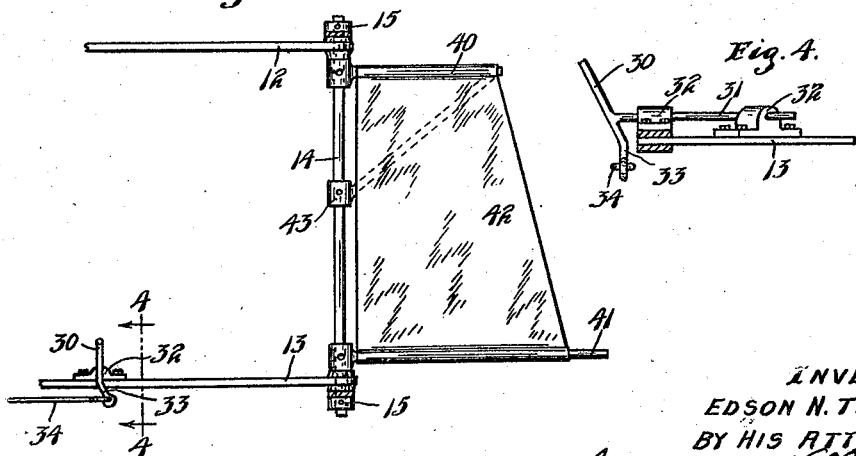
INVENTOR.
EDSON N. TUCKEY.
BY HIS ATTORNEY.

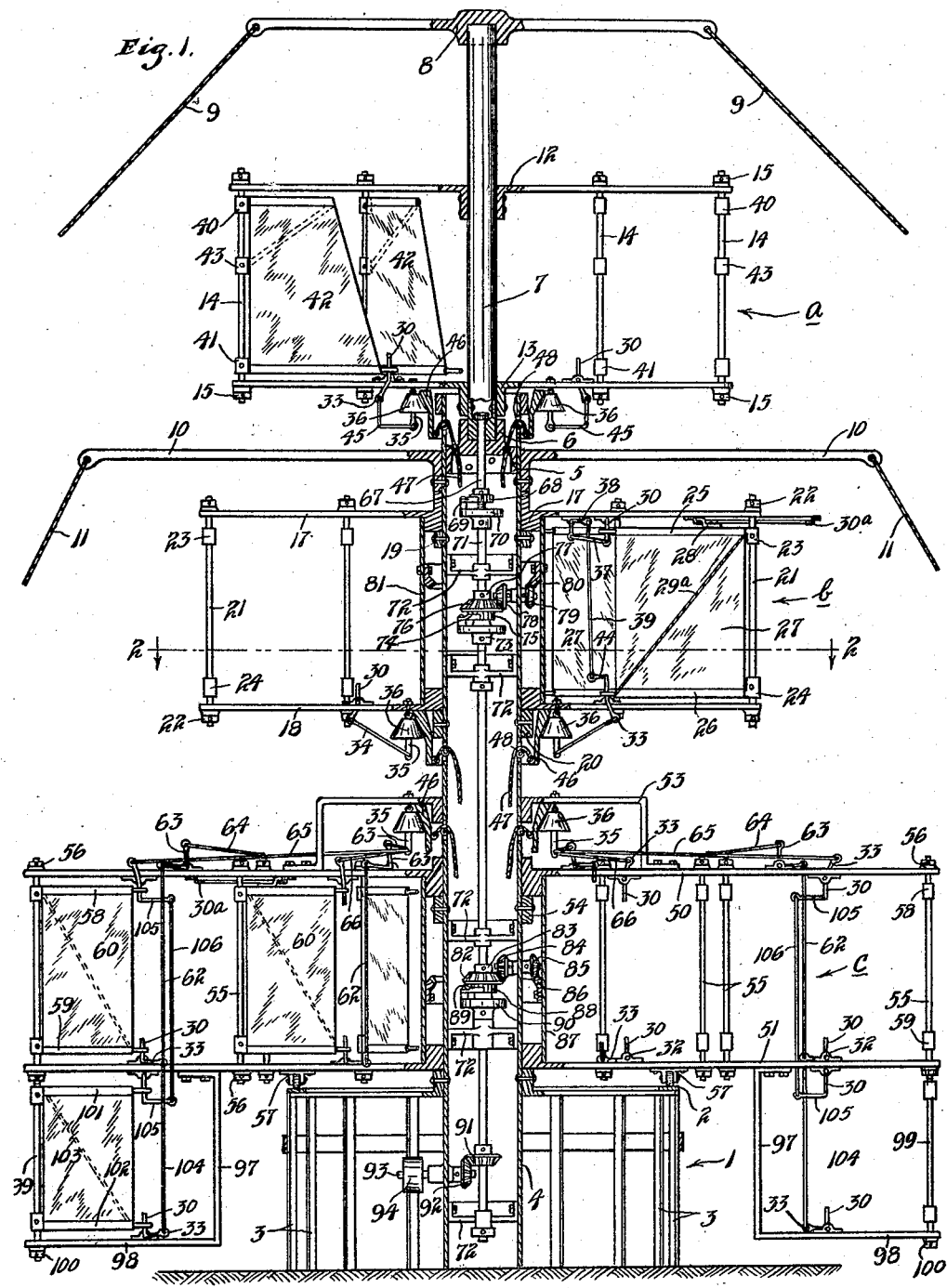

April 26, 1927.  
E. N. TUCKEY  
AIR MOTOR  
Filed June 28, 1923  
1,626,313  
3 Sheets-Sheet 3
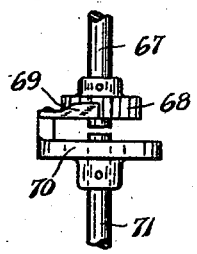
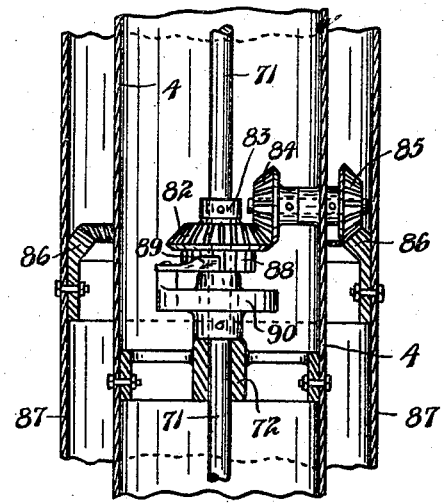
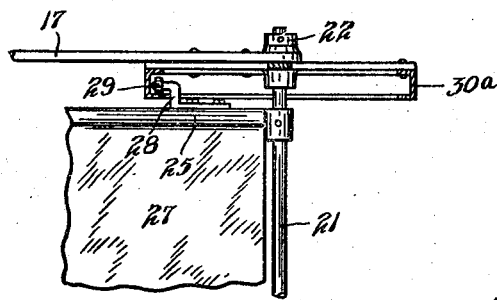
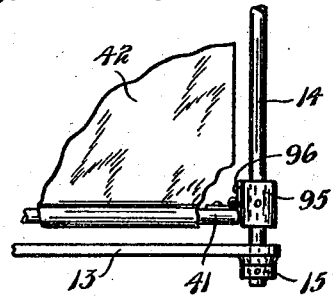
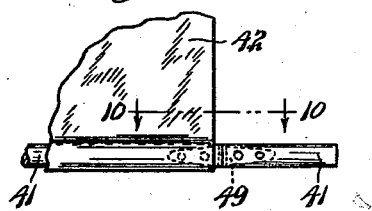
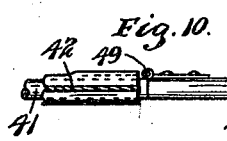
INVENTOR.  
EDSON N. TUCKEY.  
BY HIS ATTORNEY.

Patented Apr. 26, 1927.

1,626,313

UNITED STATES PATENT OFFICE.

EDSON N. TUCKEY, OF MINNEAPOLIS, MINNESOTA.

AIR MOTOR.

Application filed June 28, 1923. Serial No. 648,176.

This invention relates to an air motor and preferably to such a motor adapted to be supported in the open air and operated by the wind. The invention contemplates a motor supported at considerable elevation on a tower or similar support or other suitable structure. While various means for rotating the motor are contemplated, sails formed of some suitable material preferably are used. The motor is of the type comprising one or more revoluble frames, each of which carries a plurality of said sails.

It is an object of this invention to provide such a motor comprising a plurality of individually acting units arranged on a common support and preferably rotated about a common axis.

It is a further object of the invention to provide such a device comprising said spaced individual rotating units preferably arranged about a vertical axis and mounted for independent rotation and for common or independent connection to a transmission mechanism.

It is a further object of the invention to provide such a motor comprising a revoluble frame having therein a plurality of revoluble members arranged circumferentially about the axis of said frame, each of which members carries a sail together with means for holding said sails against the wind at certain points in the revolution of said frame.

It is still another object of the invention to provide such a motor as above set forth, together with means for rendering the above said means inoperative so that the sails will swing freely in the wind and will not be held against the wind.

It is still another object of the invention to provide such an air motor having a central support comprising spaced sides with one or more revoluble frames mounted on said support to revolve about the same, which frames carry a plurality of spaced revoluble sail carrying members together with a transmission mechanism disposed between the sides of said supporting member to which the said motors are connected for common or independent rotation.

It is another object of the invention to provide a motor comprising a revoluble frame carrying a plurality of spaced revoluble sail carrying members together with means supported on said frame for positively guiding the sails in their swinging movement, one embodiment of said guiding means being a circular track.

It is another object of the invention to provide an air motor having such a revoluble frame comprising a plurality or series of revoluble spaced sail carrying members, each of which series comprises a plurality of sail carrying members spaced outwardly from the axis of said frame.

It is still another object of the invention to provide an air motor having a frame carrying a plurality or series of revoluble sail carrying members, some of which series are spaced outwardly of the axis of said frame and some of which series are vertically spaced from each other.

It is also another object of the invention to provide an air motor comprising a plurality of separate vertically spaced units rotating about a common axis together with means for rendering any one of said units operative or inoperative.

These and other objects and advantages of the invention will be fully set forth in the following description made in connection with the accompanying drawings in which like reference characters refer to the same parts throughout the different views, and in which, Fig. 1 is a central vertical section through the device;

Fig. 2 is a horizontal section taken substantially on the line 2—2 of Fig. 1, as indicated by the arrows;

Fig. 3 is a vertical section taken on the line 3—3 of Fig. 2, as indicated by the arrows;

Fig. 4 is a vertical section taken on the line 4—4 of Fig. 3, as indicated by the arrows;

Fig. 5 is a fragmentary central vertical section of a portion of the device shown on an enlarged scale;

Fig. 6 is a larger view in side elevation of a portion of the device;

Fig. 7 is a fragmentary view partially in side elevation and partially in vertical section showing the guiding means for one of the sails;

Fig. 8 is a fragmentary view in side elevation of a modified way of connecting the lower portion of one of the sails;

Fig. 9 is a fragmentary view on an enlarged scale showing the construction of one of the ends of the sail carrying arm; and Fig. 10 is a section of Fig. 9, taken on the line 10—10, as indicated by the arrows.

Referring to the drawings, the supporting means is indicated generally as 1, which, in actual practice, would be the top of a tower supporting the device at considerable elevation. Such tower, of course, would be of a suitable structure and in the embodiment of the invention illustrated, the same is shown as having a top frame 2 with spaced supporting struts or members 3 mounted about a central column or inner tower 4 in which the frame 2 is secured by having a central hub fitting thereabout. The central column or support 4, as shown, has spaced sides and is illustrated as in the form of a cylinder. Adjacent the top of the member 4 an inner supporting member 5 is secured having a central upstanding hub 6 forming the support and bearing for a central shaft or column 7 rising therefrom, the latter carrying a bracing means 8 at its top portion having radially extending arms to which guy cables 9 are secured, which cables extend to suitable supporting means at the ground. The column 4 also has secured thereabout adjacent its top a hub member 10 having radially extending arms, the ends of which are also held in position by guy-cables 11 extending to and secured at a suitable point on the ground. Revolubly mounted on the member 4 and member 7 in spaced relation along the axes thereof are individual rotating units or motors designated on the drawings, respectively, from top to bottom as a, b and c. The motor a comprises a frame having a top member 12 and a bottom member 13, both having hubs of considerable extent secured on the shaft 7, the members 12 and 13 being connected by rods 14 extending therebetween in circumferentially spaced relation and being held in position by collars 15 pinned or otherwise suitably secured to the ends thereof. The members 12 and 13 are provided with bearings, as shown, at their outer ends in which the members 14 turn and said latter members are mounted for free rotation in said bearings and are provided with anti-friction bearings, not shown, which may be of any suitable type, such as the standard ball bearing.

The motor b comprises a frame having a top member 17 and a bottom member 18, both having central hubs of considerable extent journaled on the member 4, the said hubs being supported, respectively, by rings 19 and 20 secured to the member 4, the hub 17 being disposed directly below the member 10. The members 17 and 18 also carry bearing hubs at their outer ends in which are journaled rods 21 extending between said frames and held in position by collars 22 suitably secured by pins or other means to said rods. The rods 21 are mounted for free rotation to the members 17 and 18 and preferably will be provided with suitable ball bearings or other anti-friction means. The members 21 have secured thereto hubs 23 and 24 of sail carrying arms 25 and 26, respectively. The sail 27 is secured to and extends between the arms 25 and 26. While the sails used in this invention may be of any desired shape or type, in the embodiment of the invention illustrated, particularly in the motor b, said sails are shown as of rectangular shape. Each arm 25 has secured thereto an angle bracket 28 carrying at its end a rudder 29 adapted to rest upon and travel on the inner side of the lower flange of an angle bracket of a circular channel track member 30ª secured to the member 17. A bracing member 29ª extending from the pivoted end of the arm 25 to the outer end of the arm 26 is illustrated which is adapted to add rigidity to the sail structure. The sails 27 are thus mounted for free swinging movement about the members 21 and will swing to various positions about said members, as shown in Fig. 2. In order to hold these sails against the wind during certain portions of the revolution of the frame member carrying the same, stop members 30 are provided having arms 31 extending substantially horizontally and journaled in bearings 32 carried on the arms of members 17 and 18. These stop members 30 are contacted by the ends of the arms 25 and 26. The stop members 30 have downwardly extending portions 33 projecting below the frame members 18 which are connected to one end of links 34, the other end of which links have secured thereto bars 35 on which are journaled conical rollers 36, the ends of the bars 35 being swingingly secured to the hinges disposed in and depending from the member 18. The stops 30 secured to member 17 have downwardly projecting arms connected by links 37 to one end of bell crank levers 38 pivoted in bearings secured to the member 17 and the other ends of said bell crank levers are connected by links 39 to arms 44 projecting upwardly from the stops 30 which are secured to the member 18.

Referring again to the motor a it will be seen that the bars 14 have secured thereto the arms 40 and 41 adjacent the top and bottom thereof, respectively, to which are secured the top and bottom, respectively, of the sail 42, which sail, in the embodiment of the invention illustrated is shown as being trapezoidal in shape. A brace arm 43 is also secured to the rod 14 and extends upwardly to the end of rod 40 to which it is secured. The end of the arm 41 engages the stop 30 journaled in bearings on the member 13, which stop has already been described. The depending arm 33 of each stop 30 is connected to an angle link 45, the other end of which is connected to one of the bars 35 carrying roller 36, the end of bar 35 being pivotally secured to a hinge depending from member 13, as already described. The rollers 36, of the motors $a$ and $b$, as well as the rollers 36 of motor $c$ to be later described, are disposed outside of and are adapted to be contacted by rings 46 having inverted conical outer surfaces and surrounding the member 4. The rings are separately supported by individual flexible members 47 secured at opposite points to the inside thereof and passing over pulleys 48 journaled in slots formed in the sides of member 4. The members 47 extend downwardly through the member 4 in a position to be conveniently operated from the bottom of the device where, if desired, they may be connected to suitable operating means. The outer end of the arms 41 are hinged on a vertical axis by hinges 49, the axis of said hinge being disposed on the side of the stops 30 adjacent the rods 14 for a purpose to be later described.

The motor $c$ comprises upper and lower frames 50 and 51 having central hubs journaled on the member 4 and also an auxiliary frame 53 of open rectangular shape which also has the central hub journaled on the member 4 and also outwardly extending ends bolted to the member 50. The hub of member 51 rests on the central hub of the frame member 2 while the central hub of member 50 rests on a ring 54 secured to the member 4. The members 50 and 51 have formed at their outer ends and intermediate thereof bearing hubs in which are journaled rods 55, said hubs and rods preferably being arranged in radial lines. The rods 55 are held in place by collars 56 suitably pinned or secured to the same and also preferably provided with anti-friction bearings so that the rods 55 revolve freely in the bearings in members 50 and 51. The member 51 is also provided with wheel carrying brackets 57, the wheels of which revolve on the outer portion of frame member 2 and assist in supporting the member 51. The rods 55 have secured thereto adjacent their tops and bottoms, respectively, arms 58 and 59 to which are secured the sails 60 which, in the embodiment of the invention illustrated, are shown as of rectangular form. The ends of rods 58 and 59 contact stop member 30, already described. The stop members 30 which are journaled in bearings secured to the member 51 have their extension arms 33 secured to links 62, which links, at their upper ends, are journaled to bell crank levers 63 journaled in bearings secured to the member 50 and the other end of said bell crank levers are connected by links 64 to long links 65. The links 65 are pivotally connected to the bars 35 carrying rollers 36, which bars are pivotally hung from hinges depending from the frame 53.

The arms 33 of the stops 30 which are journaled in bearings secured to the members 50 are connected to the links 65 or to the shorter links 66 which are, in turn, connected to the members 35.

The frame member 51 has supplemental frames secured thereto comprising the vertical members 97 and the horizontal members 98, which frames depend from member 51. Rods 99 are pivoted in bearings adjacent the end of members 98 and 51, which rods are held in place by suitable collars 100 secured thereto which preferably will be provided with anti-friction bearings. Arms 101 and 102 are secured respectively, adjacent the top and bottom of each rod 99 and support therebetween, a sail 103. The ends of arms 101 and 102 contact with the arms of stops 30 journaled in bearings secured to members 51 and 98. To arms 33 of the stops 30 secured to member 98 are connected upwardly extending links 104 connected at their upper ends to the arms of bell crank levers 63 on member 50. The arms 105 of the stops with which arms 101 contact are connected to links 106 which are connected at their upper ends to the arms 105 of the stops on member 50 with which arms 58 contact.

A shaft 67 has a squared portion fitting a similarly shaped aperture in the bottom of shaft 7 and is equipped with a head at its upper end supporting the same from shaft 7. This shaft 67 extends through the hub 6 and has a ratchet wheel 68 pinned at its lower end adapted to engage with a collar member 69 carried by a disk 70 which is pinned or otherwise secured to the upper end of a shaft 71. The shaft 71 is journaled in bracket bearing 72 secured to the inner side of member 4 and has pinned, or otherwise secured thereto, a disk 73 carrying a pawl 74 adapted to be engaged by a ratchet wheel 75 formed on a beveled gear 76 journaled on the shaft 71, said gear 76 being held from upward movement by a collar 77 pinned to shaft 71 immediately thereabove. The gear 76 is engaged by another beveled gear 78, secured to the end of a shaft journaled in a bearing formed in the side of member 4, the other end of said shaft carrying a pinion gear 79 which meshes with an annular gear 80 secured to the inner side of a sleeve 81 extending between and secured to the hubs of members 17 and 18. The shaft 71 also has journaled thereon adjacent the motor $c$ a beveled gear 82 held in place by a collar 83 secured to shaft 71. The beveled gear 82 meshes with another gear 84 secured to a shaft journaled in a bearing in the side of member 4 carrying at its other end a pinion gear 85, which latter meshes with an annular gear 86 secured to the inner side of a sleeve 87 which extends between and is secured to the hubs of the members 50 and 51. A beveled gear 82 has formed thereon a ratchet wheel 88 adapted to engage with a collar 89 carried by a disk 90 secured to the shaft 71. The shaft 71 has secured adjacent its lower end a beveled gear 91 meshing with another gear 92 secured to the inner end of a shaft 93, the outer end of which shaft is disposed outside the member 4 and has secured thereto a pulley 94 adapted to be connected with a belt for delivering power from the device.

In the modification shown in Fig. 8, the inner ends of arms 41 are connected to hubs 95 by hinges 96 so that the arms 41 can swing upwardly, the hubs 95 being secured to the rods 14.

In operation, the rings 46 will be held in raised position out of contact with the rollers 36 so that the stops 30 are in operative position to be engaged by their respective arms. Considering the operation of one of the motors, particularly that shown in Fig. 2, it is assumed that the wind is blowing from the direction of the arrows $d$. It will be seen that as the frame member 18 revolves in the direction indicated by the dotted lines and arrows $e$, that the sail $27^a$, as it reaches the position shown in said figure, will be moved by the wind so that the arms 25 and 26 thereof will contact with their stops 30. This sail will thus be held against the stop until it reaches the position shown by sails $27^b$ and $27^c$, and, in fact, until it reaches substantially the position diametrically opposite that occupied by sail $27^a$ in Fig. 3. As it passes this latter position, the wind will act upon the other side of the sail and it will swing in the direction indicated by the dotted line and arrow $f$ to substantially the position shown for sail $27^d$. The sail thus swings away from its stop 30 and is blown out freely in the direction parallel to the direction of the wind. As the sail passes the point shown occupied by sail $27^d$ it will again move relatively to the frame in the direction indicated by the arrows and dotted lines $g$. This angular movement of the sail, of course, is caused by it keeping parallel with the direction of the wind. The sail continues to turn in the direction indicated by said arrows and dotted lines $g$ until it again comes into position against the wind so that its arms 25 and 26 are again brought against the stop 30 in the position occupied by sail $27^a$. While theoretically, the sails do have the range of movement indicated in Fig. 2, in actual practice, owing to the speed of rotation of frame members 18, the sails will not have such a great range of movement and will probably not swing more than ninety degrees from the position against the stop. It is thus seen that the sails are only effective for driving the motor when they are in position to have the wind against them and thus have no retarding effect when on the opposite side of the revolution. It is apparent that the sails for the motors $a$ and $c$ will act in the same manner. If it is desired to continue the operation of one or more of the motors, the proper ring 46 will be lowered by its respective cables 67 and will contact with and force outwardly the rollers 36. Owing to the fact that some of these rollers will be held in a normal position with more or less force due to the action of the ends of the sail arms against the respective stops, when the ring 46 is first lowered, the same will take a tilted position and will only operate the stops 30 which are not contacted by any of the sail arms. As soon, however, as the frame moves around to bring the sails out of contact with their stops, the rollers will successively be moved outwardly and the stops of same brought to inoperative position. The sails will then merely swing freely in the wind and will not act to revolve their respective motors. It will thus be seen that the sails of any one of the motors can be rendered inoperative. Such manipulation will be desirable when the wind is unusually strong, or during a storm. When the motors $a$, $b$, or $c$ attain a certain speed the rollers 36 will also be thrown outward by centrifugal force, and will move stops 30 to render the same inoperative.

The shaft 67 will be driven form shaft 7 by the motor $a$ and the ratchet wheel 68 thereof will, through the pawl 69, drive disk 70 and shaft 71. The shaft 71 will, therefore, always be driven when motor $a$ is revolving in one direction, which is the direction of its power movement. If the motors $b$ and $c$ are not in operation, the shaft 71 will drive the pulley 94 merely by the operation of motor $a$. At this time the pawls 74 on disk 73 and 89 on disk 90 merely ride around on their respective ratchet wheels. If the motor $b$ now be thrown into operation, and revolved at approximately the same speed or a greater speed than the motor $a$, the gear 78 will be driven through the annular gear 80 so that the ratchet wheel 75 on gear 76 will pick up the pawl 74 and the motor $b$ will then also drive the shaft 71. Similarly, if the motor $c$ be operated so as to revolve the gear 82 at higher speed than the shaft 71, the ratchet wheel 88 thereof will pick up the pawl 89 and also drive the shaft 71 through the disk 90. It will thus be seen that any one or all of the motors can be used to drive the shaft 71 and transmit power through the pulley 94. The top motor $a$, of course, can be thrown out of operation and the shaft 71 driven by either of the motors $b$ or $c$, if desired. In the type of sail shown in motor $a$, if the arms 41 should by any chance jump over its stop 30, it would swing free in the wind and upon its coming around in its next revolution to position against the stop, hinge 49 would allow the end thereof to pass the stop and the wind would then immediately force the arm 41 against the stop with the hinge in its straightened position so that said arm would then again properly engage the stop.

In the modification shown in Fig. 8, the arm 41 is shown as hinged to its hub 95 so that in case of unusual wind stress on the sail the arms may lift slightly to allow the sail to bow somewhat. The friction of the end of the arms against the stop will, in this case, be relied upon to hold it in engagement with the stop.

From the above description it is seen that applicant has provided a simple and efficient form of wind motor and one which will give a great amount of power. The various motors, as stated, can be individually controlled and can be individually connected or disconnected from the transmission mechanism. It is, of course, within the scope of the invention to provide the sails with any suitable form of attaching or furling means, which means are well known, and specifically form no part of the present invention. The device can be made very strong and durable and the parts thereof, when once in position, will need little attention for maintenance or repair.

It will, of course, be understood, that various changes may be made in the form, details, arrangement and proportion of the parts without departing from the scope of applicant's invention, which, generally stated, consists in a device capable of carrying out the above stated objects, in the matter shown and described and set forth in the appended claims.

What is claimed is:

1. A wind-operated device having in combination, a plurality of spaced revoluble motors, each comprising a revoluble frame carrying a plurality of revoluble sail carrying members, and means for holding said members in position with the sails against the wind during a portion of the revolution of said frame so as to revolve said frame, a common driving means to which all of said frames are connected permitting independent movements of said frames, separably operable automatic means rendering said first mentioned means of each motor inoperative, and means for actuating said automatic means manually at will.

2. A wind motor having in combination, a revoluble frame, a plurality of circumferentially spaced series of vertically spaced revoluble sail carrying members and a plurality of circumferentially spaced series of horizontally spaced revoluble sail carrying members carried by said frame, a stop for each sail carrying member for holding the same in position with the sail against the wind for a portion of the revolution of said frame and a single member for moving all of said stops to render the same inoperative.

3. A wind motor comprising a tubular supporting member, a revoluble frame mounted thereon carrying a plurality of sail-supporting members, said members being revoluble about axes parallel to the axis of said frame, a stop for holding each member in position with its sail against the wind for a portion of a revolution of said frame, a plurality of circumferentially disposed members adjacent said tubular supporting member and connected to said stop adapted to swing under the action of centrifugal force to move said stops to inoperative position, and a member loosely surrounding said tubular supporting member adapted to be moved manually to engage said last mentioned members and move the same and said stops to inoperative position.

4. A wind-operated device having in combination, a common support, a plurality of independent wind motors mounted on said support to rotate about a common vertical axis, a transmission means and means comprising a one-way pawl and ratchet mechanism connecting each of said motors to said transmission means for driving the same by all of said motors or by the motors individually, whereby said motor will automatically be connected to said transmission means in accordance with the speed thereof.

5. A wind-operated device having in combination, a supporting base, a central supporting member above the same having spaced sides, a plurality of wind motors carried on said member in vertically spaced relation for revolution about vertical axes, a transmission means disposed in said member, means connecting the top motor to said means so that said motor, when operating, will drive said means, means for independently and automatically connecting the other motors to said means, and means for rendering any one of said motors inoperative at will.

6. A wind motor comprising a revoluble frame, a plurality of sail carrying members mounted to swing about axes parallel to and circumferentially disposed about the axis of said frame, means for holding said sails against the wind in one portion of the revolution of said frame to turn said frame comprising a series of stop levers, a series of circumferentially disposed swinging rollers and a ring having an inverted conical surface adapted to engage all of said rollers to move the same and swing said stop levers to inoperative position.

7. The structure set forth in claim 6, a tubular support for said frame, said ring loosely surrounding said support, and means disposed in said support connected to said ring for raising or tilting the same, said ring descending by gravity.

8. A wind motor comprising a revoluble frame mounted to rotate about a vertical axis, a plurality of members revoluble about vertical axes mounted in said frame and circumferentially spaced about the axis of said frame, sails secured to said members having booms at one end thereof projecting from said members, and stops arranged to be contacted by the ends of said booms beyond said sails to hold said sails in position against the wind at certain portions of the revolution of said frame.

9. The structure set forth in claim 8, said stops having bars connected thereto, rollers carried by said bars, an annular means adapted to engage all of said rollers and move the same to move the stops to inoperative position.

10. A wind motor comprising a revoluble frame mounted to rotate about a vertical axis, a plurality of members revoluble about vertical axes mounted in said frame and circumferentially spaced about the axis of said frame, sails secured to said members having booms at one end thereof projecting from said members, stops arranged to be contacted by the ends of said booms to hold said sails in position against the wind at certain portions of the revolution of said frame, said stops having bars connected thereto, rollers carried by said bars, and annular means adapted to engage all of said rollers to move the same to move the stops to inoperative position, said annular means comprising a weighted ring capable of a tilting movement.

11. A wind-operated device comprising a vertical supporting member having spaced sides, a frame revoluble about said supporting member, a plurality of circumferentially spaced freely revoluble sail carrying members in said frame, stops for holding said sail carrying members in operative position, means connected to said stops carrying spaced rollers disposed about said supporting member, means disposed about said supporting member for engaging said rollers to move said stops, and means disposed in said supporting member for raising and lowering said last mentioned means into contact with said rollers.

12. The structure set forth in claim 11, said means engaging the rollers comprising a ring and said last mentioned means comprising flexible members secured to the inner side of said ring and movable over pulleys mounted on said supporting member and extending downward in said supporting member and adapted to raise and lower said ring.

13. A wind motor comprising a central support having spaced sides, a revoluble frame mounted on said support carrying a plurality of circumferentially spaced swinging sails for propelling said frame, a central transmission shaft in said supporting member, a gear journaled thereon, a shaft extending at right angles to said shaft, having a gear at one end meshing with said gear and having a pinion at its other end outside of said supporting member, an annular gear meshing with said pinion, and a one-way clutch between said first mentioned gear and said first mentioned shaft.

14. A wind motor comprising a revoluble frame, a plurality of freely revoluble members circumferentially spaced about the axis of said frame, sails carried by said members, arms at one end of said sails having a guiding means thereon, and a curved track engaged by said means and on which it travels.

15. A wind motor comprising a revoluble frame, a plurality of freely revoluble members circumferentially spaced about the axis of said frame, sails carried by said members, arms at the upper side of said sails, a circular track secured to said frame having a horizontal flange thereon, rollers carried by said arms and running, respectively in said tracks, and stop members on said frame for holding said sails in position against the wind at certain portions of the revolution of said frame.

16. A wind motor comprising a revoluble frame having a plurality of series of revoluble sail carrying members thereon arranged circumferentially about the axis of said frame, each series comprising a plurality of freely revoluble sail carrying members spaced outwardly from the center of said frame, and means for holding said sail carrying members in position with their sails against the wind during a portion of the revolution of said frame.

17. A wind motor comprising a revoluble frame having a plurality of series of freely revoluble sail carrying members thereon arranged circumferentially about the axis of said frame, said series of sail carrying members being arranged in vertically spaced relation on said frame, means for holding said sails in position against the wind during a portion of the revolution of said frame and means operated by a single member for rendering said last mentioned means inoperative.

18. A wind motor comprising a revoluble frame, a plurality of spaced series of sail carrying members said members in each series being mounted to swing about axes parallel to and circumferentially spaced about the axis of said frame, stops for holding all of said members in position with the sails against the wind during a portion of the revolution of said frame, and automatic means for rendering all of said stops inoperative.

19. A wind motor having in combination, a tower, a revoluble frame, said tower constituting the support and axle of said frame, said frame comprising two vertically spaced series of radial arms, members connecting the respective arms of said series, spaced spars mounted on and revoluble about the axes of said members respectively, a sail of flexible sheet material secured to and extending between said spars, and stop means adapted to engage the end of one of said spars outwardly of said sail.

20. A wind motor comprising a plurality of sails each comprising a member revolving about a vertical axis having spaced rods secured to and extending substantially at right angles thereto, and a sail of flexible material secured to and extending between said rods one of said rods projecting beyond said sail.

21. The structure set forth in claim 20, and a tension member extending from the inner end of one of said rods to the outer end of the other.

In testimony whereof I affix my signature.

EDSON N. TUCKEY.